Sept. 2, 1969    R. O. SCHULTZ ET AL    3,464,710
CHUCK MECHANISM

Filed March 3, 1967    2 Sheets-Sheet 1

INVENTORS
ROGER O. SCHULTZ
JOSEPH L. HORVATH
BY Yount, Raney, Flynn and Tarolli
ATTORNEYS Sept. 2, 1969   R. O. SCHULTZ ET AL   3,464,710
CHUCK MECHANISM
Filed March 3, 1967   2 Sheets-Sheet 2

INVENTORS
ROGER O. SCHULTZ
JOSEPH L. HORVATH
BY
ATTORNEYS

United States Patent Office 3,464,710
Patented Sept. 2, 1969

3,464,710
CHUCK MECHANISM
Roger O. Schultz, Malvern, and Joseph L. Horvath, Berwyn, Pa., assignors to The Warner & Swasey Company, Cleveland, Ohio, a corporation of Ohio
Filed Mar. 3, 1967, Ser. No. 620,504
Int. Cl. B23b *31/30, 31/10, 5/32*
U.S. Cl. 279—4
8 Claims

ABSTRACT OF THE DISCLOSURE

A rotatable spindle carries on its outer end a collet chuck mechanism. The collet chuck mechanism grips a workpiece and is movable between gripping and non-gripping positions upon movement of a pusher tube located within the spindle member. A mechanical lever arrangement transmits the force from the pusher tube to the collet mechanism. The lever arrangement is constructed to multiply the force applied thereto by the pusher tube and supply a greater force to the collet mechanism.

---

The present invention relates to a mechanism for gripping a workpiece, and particularly to a collet mechanism for use in association with the spindle of a machine tool to secure the workpiece in position for rotation with the machine tool spindle.

The principal object of the present invention is the provision of a new and improved workpiece gripping mechanism for use in association with a machine tool and which has an extremely high gripping power, requires little space and thus is capable of use with machine tools having limited available space, and is quite simple in construction.

A further object of the present invention is the provision of a new and improved workpiece gripping mechanism having a collet member for gripping the workpiece and wherein the collet member is actuated by a pusher member through force transmitting means which is operable to multiply the force applied thereto by the pusher member and apply an increased force to the collet member.

A still further object of the present invention is the provision of a new and improved workpiece gripping mechanism, as noted in the next preceding object, wherein the force transmitting means which is operable to multiply the force received from the pusher tube consists of a mechanical linkage arrangement including a lever member pivoted intermediate its ends and having different length lever arms, the longer one of which is moved by the pusher member.

A further object of the present invention is the provision of a new and improved machine tool having a spindle which carries a workpiece gripping mechanism and wherein a pusher member is located in the spindle and is movable axially relative to the spindle to actuate a collet gripping mechanism to its gripping position through a force multiplier arrangement.

A still further object of the present invention is the provision of a new and improved machine tool, as noted in the next preceding paragraph, wherein the pusher member is moved relative to the spindle by a fluid motor and wherein the force multiplier arrangement comprises a mechanical linkage which multiplies the force applied by the fluid motor.

Yet a further object of the present invention is the provision of a new and improved mechanism for gripping a workpiece and which includes a collet member having a threaded base which is threaded into a sleeve member and wherein the sleeve member has a circumferential groove therein which receives one arm of a lever pivotally supported intermediate its ends and wherein the other arm of the lever engages a cam member which, when moved, effects movement of the sleeve member and, in turn, movement of the collet to its gripping position.

Further objects and advantages of the present invention will be apparent to those skilled in the art to which it relates from the following detailed description of a preferred embodiment thereof made with reference to the accompanying drawings forming a part of this specification and in which.

Figure 1:
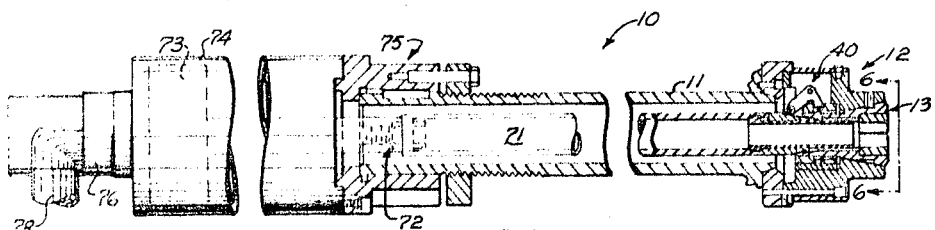
FIG. 1 is a schematic view illustrating a portion of a machine tool embodying the present invention.

The present invention provides an improved mechanism for gripping a workpiece. The mechanism is particularly adapted for use in association with a machine tool spindle to secure the workpiece in position for rotation with the spindle for machining of the workpiece. The specific machine tool with which the mechanism is associated may vary and the present invention is not limited to use with any specific machine tool construction. As representing the preferred embodiment of the present invention, FIG. 1 shows a fragmentary portion of a machine tool, generally designated 10.

The machine tool 10 includes a machine tool spindle 11 which carries on its outer end, the right end as viewed in the drawings, a workpiece gripping mechanism 12 which secures the workpiece to the spindle for rotation therewith. The workpiece gripping mechanism 12 includes a collet 13 which has a bore therein which receives the workpiece. The collet is of a known type having a plurality of spring fingers 14 which project outwardly from a base member 15.

The collet 13 is carried by a body member 20 which is secured by a plurality of screws 21 to a plate 22. Plate 22 is secured by a drive screw 23 to the forward end of the spindle 11 for rotation therewith. A removable cover or sleeve member 24 encircles the body member 20 and encloses the actuating mechanism for the collet 13. The cover member 24 is secured in position by screws 24a which extend into threaded openings of the body member 20. The body member 20 has an annular tapered surface 25 at the right end thereof, as viewed in FIG. 2, which cooperates with an annular tapered surface 26 on each of the spring arms 14 of the collet member 13.

Figure 2:
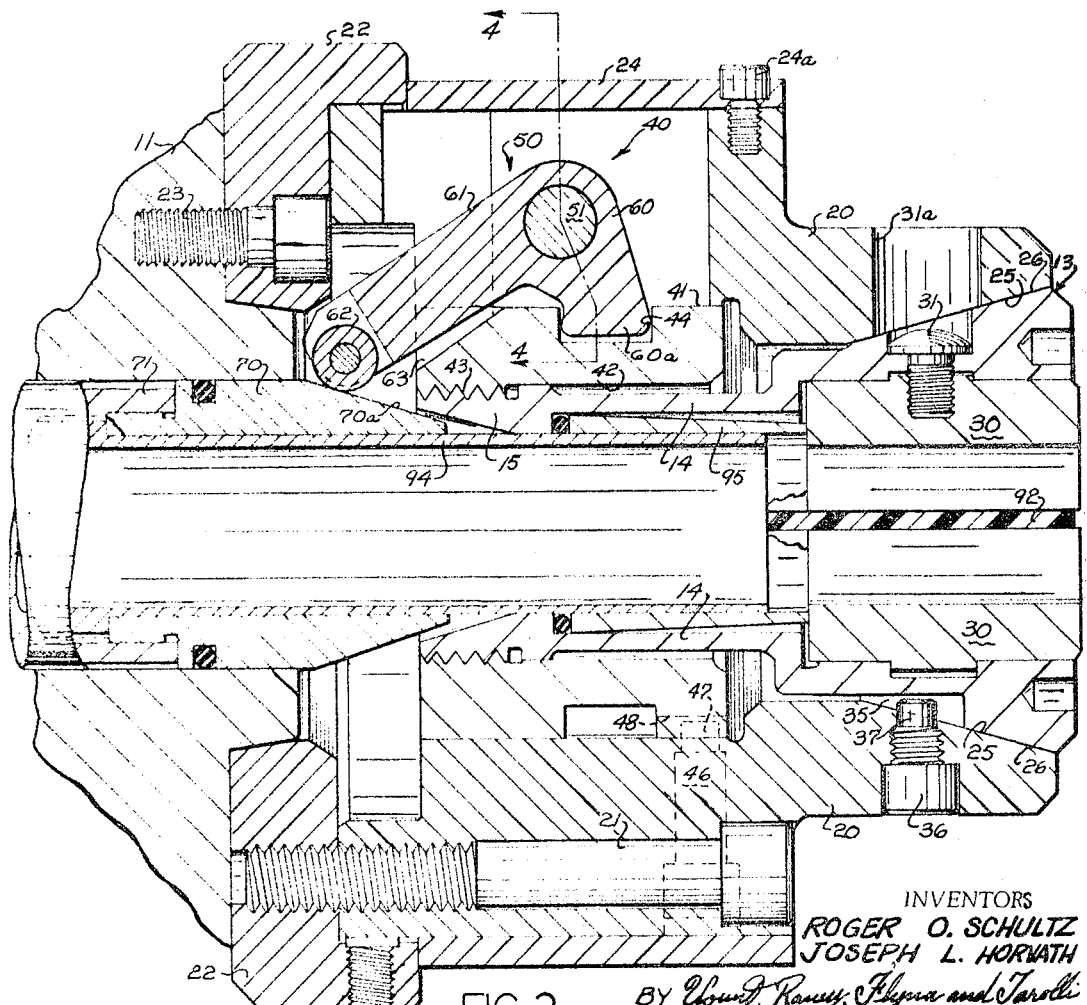
FIG. 2 is an enlarged sectional view of a portion of FIG. 1.
Figure 3:
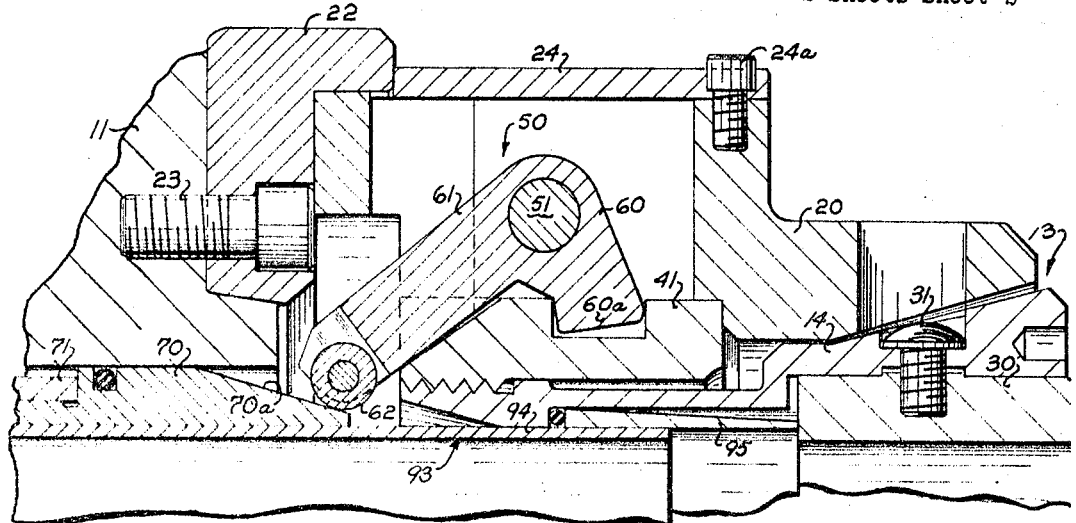
FIG. 3 is a fragmentary view similar to FIG. 2, but showing the parts in a different position.

When the collet member 13 moves to the left, from its position shown in FIG. 3 toward its position shown in FIG. 2, the tapered surfaces 26 on the spring arms 14 move into engagement with the tapered surface 25 on the body member 20. The engagement between surfaces 25 and 26 provides a wedging action on the spring fingers 14. When the collet reaches the position thereof shown in FIG. 2 spring arms 14 are wedged into tight clamping engagement with a workpiece positioned in the bore of the collet member 13, between the spring arms 14. Conversely, when the collet 13 moves to the right from its position shown in FIG. 2 toward its position shown in FIG. 3, the spring arms 14 move radially outwardly to release a workpiece in the bore of collet 13. The spring arms 14 are constructed of a resilient spring material and are biased radially outwardly. When the tapered surfaces 26 begin to clear the annular tapered surface 25 of the body member 20, the fingers 14 move outwardly away from the axis of the bore and release their grip on the workpiece.

The collet member 13 illustrated in the drawings is the collet preferred for use with this invention. However, different collet constructions may be utilized with the present invention. The collet 13 is of the type commonly known as a master collet, and the workpiece receiving bore thereof may be provided by workpiece receiving pads or bushing segments 30. The pads or bushing segments 30 are secured to the spring arms 14 by suitable fasteners, such as screws 31. The screws 31 are accessible through openings 31a provided in the forward portion of the body member 20. The pads or bushing segments 30 are utilized to adapt the collet 13 to receive stock of different cross-sectional configurations such as square, hex, and round stock. Also the pads or bushing segments 30 adapt the collet to receive different diameter stock.

The outer surface of the spring arms 14 of the collet member 13 have a plurality of axially extending grooves 35 spaced circumferentially therearound and which receive therein setscrews 36 carried by the body member 20. The setscrews 36 are threaded into body member 20 and have portions 37 which extend into the grooves 36 to ensure that the collet member 13 rotates with the body portion 20.

The collet member 13, as noted hereinabove, when it is moved to the left, as viewed in FIG. 2, effects a gripping of the workpiece. The collet member 13 is moved to the left, as viewed in FIG. 1, by a mechanical force multiplier means 40. The mechanical force multiplier means 40 includes a sleeve member 41 having a bore 42 therethrough, which bore is partially threaded at 43 to receive the base portion 15 of the collet member 13 which is threaded at its end opposite spring arms 14. The collet tension can be adjusted by controlling the extent to which base 15 is threaded into the threaded bore portion 43 of sleeve 41. A suitable tool such as a spanner wrench can be used to turn the base 15 in sleeve 41. The sleeve member 41 has a circumferentially extending groove 44 and is supported by the body member 20 for reciprocating movement along a line substantially parallel to the axis of rotation of the spindle. Suitable screws 46 are provided in the body member 20 and extend therethrough and have an end portion 47 which is received in an axially extending slot 48 in the sleeve member 41 to secure the sleeve member 41 against rotation relative to the body member 20 and permit relative axial movement.

Figure 4:
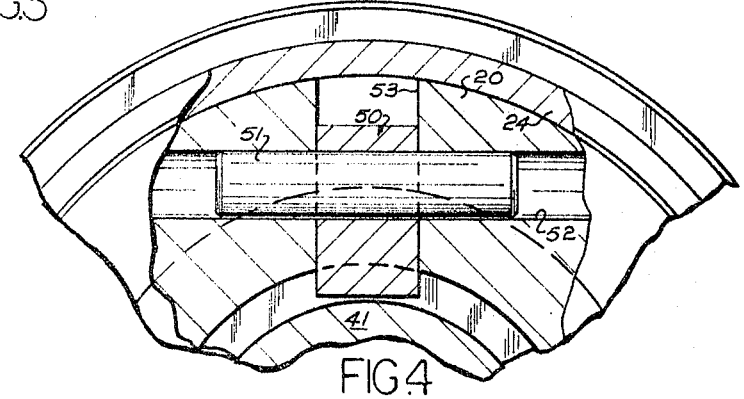
FIG. 4 is a fragmentary sectional view taken approximately along the section line 4—4 of FIG. 2.
Figure 5:
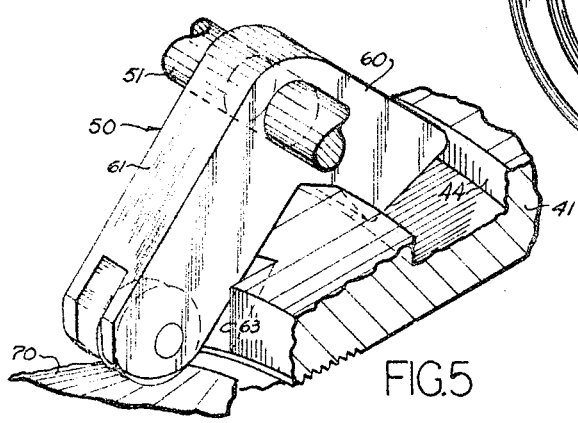
FIG. 5 is a perspective view of a portion of the mechanism of FIG. 1.
Figure 6:
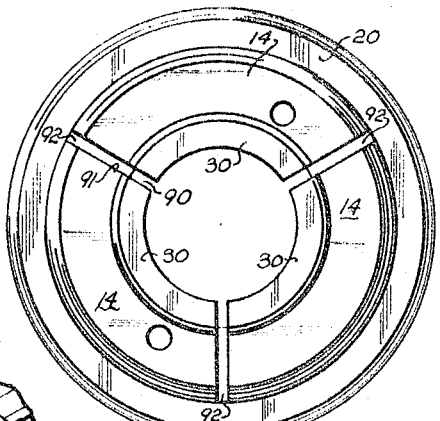
FIG. 6 is an elevational view of a portion of the machine tool viewed as indicated by arrows 6—6 of FIG. 1.

The sleeve member 41 is moved substantially parallel to the axis of the spindle 11 in a reciprocating movement by means of a plurality of levers 50. Preferably, three levers 50 are provided spaced circumferentially around the sleeve member 41. However, only one lever member 50 is shown in the drawings and only one will be described herein, it being understood that the other lever members are identical to the lever member to be described. The lever member 50 is a generally L-shaped member and pivoted intermediate its ends on a pivot pin 51. As best shown in FIG. 4, the pivot pin 51 is located in an opening 52 provided in the body member 20. The outer end of the opening 52 is closed by sleeve 24. The opening 52 intersects a radially extending slot 53 in the body member 20. The lever member 50 is located in the slot 53 and has an opening through which the pin 51 extends. The pin 51 is suitably secured in the opening 52 by a suitable setscrew, not shown, and the lever member 50 is pivotal about the axis of the pin 51.

The lever member 50 includes a lever arm portion 60 which projects from the pivot pin 51 downwardly, as viewed in FIG. 2, and has its outer end 60a located in the circumferentially extending groove 44 in the sleeve member 41. The lever member 50 has a second lever arm 61 which extends from the pivot pin 51 downwardly toward the axis of rotation of the spindle. The outer end of the lever arm 61 carries a cam follower 62. The left end of the sleeve 41 is provided with a recessed area 63 providing for movement of the lever member 61 toward and away from the axis of rotation of the spindle without interference between the sleeve 41 and the lever portion 61.

It should be apparent from the above that when the lever member 61 moves toward and away from the axis of rotation of the spindle, the sleeve member 41 will be moved in a direction parallel to the axis of rotation of the spindle and will, in turn, effect movement of the collet member 13 in a direction substantially parallel to the axis of rotation of the spindle. This as noted hereinabove will cause a gripping or release of the workpiece carried by the collet member depending upon the direction in which the collet member is moved.

The lever member 61 is moved toward and away from the axis of rotation of the spindle by a cam member 70. The cam member 70 is in the form of a sleeve having an inclined cam surface 70a. The cam member 70 is suitably secured to the outer end of a pusher member or tube 71 which extends through the hollow spindle 11 to the back end thereof, or the left end thereof as viewed in FIG. 1. The pusher tube 71 is connected through a suitable threaded connection 72 to a piston member 73 of a fluid motor 74. The fluid motor 74 is carried by the spindle 11 and is secured thereto by a suitable mechanism, generally designated 75. The fluid motor 74 thus rotates with the spindle 11 and fluid is delivered to the motor 74 through a gland member 76 and rigid conduits 78 which permit rotation of the cylinder 74 relative thereto and yet still maintains the delivery of fluid thereto.

FIG. 3 illustrates the position of the various parts when the collet member is in a release position, i.e., not gripping a workpiece. The collet member is actuated to grip the workpiece upon movement to the left from its position shown in FIG. 3. The collet member is moved to the left from its position shown in FIG. 3 upon movement of the pusher tube 71 toward the right, as viewed in the drawings. When the pusher tube 71 moves toward the right, the cam member 70 likewise is moved to the right from the position shown in FIG. 3 to the position shown in FIG. 2. When the cam member so moves, the cam follower 62 carried by the lever 61 rides up the cam surface 70a of the cam 70 and causes a pivoting movement of the lever member 50 in a clockwise direction as viewed in the drawings. This, of course, causes movement of the lever portion 60 and the sleeve member 41 toward the left, from the release position shown in FIG. 3 to the gripping position shown in FIG. 2. The described movement of the sleeve member 41 effects movement of the collet 13 toward the left and into its gripping position shown in FIG. 2.

It should be apparent that the length of the lever arm portions 60, 61 is substantially different with the length of the lever portion 60 being substantially shorter than the length of the lever arm 61. This construction provides for a multiplication of the force delivered by the pusher tube and particularly by the cam 70 to the lever 50. This force which is applied to the lever member 50 is multiplied due to the differences in the length of these lever portions and a greater force is applied thereby to the sleeve member 41 than is received by the member 50, this, of course, being a result of the differences in the lever arms. Of course, the outer end 60a of the lever arm 60 also moves a lesser extent than does the outer end of the lever arm 61.

The collet 13 releases the workpiece upon movement of the pusher tube 71 to the left as viewed in the drawings. The leftward movement of the pusher rod 71 causes a corresponding leftward movement of the cam member 70 from its FIG. 2 position to its position shown in FIG. 3. This movement removes the force holding the collet 13 in gripping condition, and the spring arms 14 effect a release of the workpiece and movement of sleeve 41 toward the right as viewed in the drawings. This results in a counterclockwise rotation of the lever member 50 to the position shown in FIG. 3.

When the workpiece is securely gripped in the collet member 13, the machining operation may proceed. During the machining operation chips and machining lubrican may flow through spaces 90 and 91 between the opposing sides of the pads or bushing segments 30 and spring arms 14 respectively. Neoprene inserts 92 are provided to closed spaces 91 to prevent or minimize the radial migration of chips therethrough. Since the inserts 92 are formed of Neoprene they are resilient and substantially impervious to the effects of the lubricant. However, the inserts 92 do not completely close openings 90 and chips may migrate axially into the interior of body member 20 through openings 90. The chips may subsequently work their way into the linkages and force multiplier mechanism 40 and foul the operation of these mechanisms.

To prevent chips from fouling the mechanism, a chip guard 93 is provided. Chip guard 93 comprises a tubular member 94 suitably connected to the right end of pusher tube 71 and moves therewith. Tubular member 94 extends forwardly therefrom through the cam member 70 and into the collet member 13. The forward end of the tubular member 94 extends into the collet member 13 and into sliding engagement with a sleeve 95. Sleeve 95 is secured in position between a portion of the base 15 of the collet member 13 and the pads or bushing segments 30. The tubular member 94 and sleeve 95 provide a telescoping chip guard which prevents chips and lubricant from fouling the collet actuating mechanism. The chips collect in the interior of the tubular member 94 and are periodically removed.

It should be apparent from the above detailed description that an improved workpiece gripping mechanism is provided by the present invention and that certain modifications, changes, and adaptations may be made therein by those skilled in the art to which it relates, and it is hereby intended to cover all such changes, modifications, and adaptations coming within the scope of the appended claims.

Having described our invention, we claim:

1. In a machine tool, at rotatable spindle, a mechanism carried by the spindle for gripping a workpiece, said mechanism including a collet having workpiece gripping portions operable to grip and release the workpiece, a member secured to said spindle and having a tapered surface against which a tapered surface of said gripping portions are moved to effect gripping of the workpiece, means for moving said collet to effect movement of the gripping portions against said tapered surface and operable to forcefully hold said gripping portions against said surface including an elongated movable pusher member extending axially of said collet and located within said spindle, means carried by the spindle for moving said pusher member axially relative thereto, means interconnecting said pusher member and said collet to effect movement of said collet upon movement of the pusher member and operable to multiply the force applied thereto by the pusher member and apply an increased force to said collet, and a chip guard, said chip guard comprising a tubular member secured to said pusher member and extending axially thereof into sliding engagement with said collet and blocking the movement of chips from the collet into contact with said means interconnecting the pusher member and the collet.

2. In a machine tool as defined in claim 1 wherein said means for moving said pusher member comprises a fluid cylinder carried by said spindle at the end thereof opposite the end carrying the workpiece gripping mechanism and having a piston rod secured to said pusher member.

3. In a machine tool as defined in claim 2 wherein the pusher member carries a sleeve cam member for actuating said means operable to multiply the force applied thereto and wherein said means interconnecting said pusher tube and collet comprises at least one lever member having a lever arm in operative engagement with said cam member and movable upon movement thereof and a second lever arm operatively connected to the collet to effect reciprocating movement of the collet in a direction substantially parallel to the axis of rotation of the spindle upon movement of the pusher member.

4. In a machine tool as defined in claim 3 wherein said one lever arm of said lever member is substantially longer than said other lever arm of said lever member to provide said force multiplication.

5. In a machine tool as defined in claim 1 wherein said chip guard further comprises a sleeve member in said collet and slidably receiving one end of said tubular member.

6. In a machine tool as set forth in claim 1 further including insert means located between the workpiece gripping portions of said collet for at least partially blocking radial movement of chips through spaces between the workpiece gripping portions.

7. In a machine tool as set forth in claim 6 wherein said insert means is formed of a resilient material which is substantially impervious to the effects of a lubricant used with the machine tool.

8. A mechanism comprising a spindle, a workpiece engaging collet located at one end portion of said spindle, said collet having a threaded base portion and a plurality of spring workpiece gripping portions extending axially from said base portion, a sleeve member located within said spindle and mounted in threaded engagement with said base portion of said collet to thereby enable the axial relationship between said sleeve member and said collet to be adjusted, retaining means mounted on the one end portion of said spindle in engagement with said collet and said sleeve member for preventing relative rotation therebetween once the axial relationship between said collet and sleeve member has been adjusted, said sleeve member having a circumferentially extending annular groove therein, a plurality of lever members pivotally mounted on said one end portion of said spindle for rotation about an axis extending transversely to a longitudinal axis of said spindle and a longitudinal axis of said sleeve member, each of said lever members having two arm portions extending toward the axis of said collet, one of said arm portions of each of said lever members extending into the circumferentially extending groove formed in said sleeve member and being adapted to engage and effect axial movement of said sleeve member in at least one direction upon rotation of the lever member about its transverse axis, cam surface means located within said spindle in a generally coaxial relationship with said sleeve member and tapering radially and axially outwardly in a direction away from said sleeve member, said cam surface means being engaged by another arm portion of each of said lever members for effecting pivoting movement of said lever members upon axial movement of said cam surface means, and hydraulic pusher means located at least partially within said spindle for moving said cam surface means toward said sleeve member to pivot said lever members and thereby move said sleeve member and collet axially toward said cam surface means to operate said collet to a workpiece gripping condition, said other arm portions of said lever members being longer than said one arm portions of said lever members to multiply forces applied to said lever members by said cam surface means upon movement of said cam surface means toward said sleeve member by said hydraulic pusher means to thereby effect the application of an increased force to move said collet.

References Cited
UNITED STATES PATENTS

| | | | |
|---|---|---|---|
| 1,864,786 | 6/1932 | Wilkins | 279—51 |
| 1,947,957 | 2/1934 | Tillman | 279—106 |
| 2,375,115 | 5/1945 | Kylin | 279—1 |
| 2,476,693 | 7/1949 | Bogart | 279—4 |
| 3,097,856 | 7/1963 | Brown | 279—4 |
| 3,097,857 | 7/1963 | Morgan | 279—4 |

ROBERT C. RIORDON, Primary Examiner

DAVID R. MELTON, Assistant Examiner

U.S. Cl. X.R.

279—51